Dec. 24, 1963 S. N. COUZENS 3,115,377
TERMINAL UNIT FOR MOVABLE ELECTRICAL APPARATUS
Filed Dec. 11, 1962 2 Sheets-Sheet 1
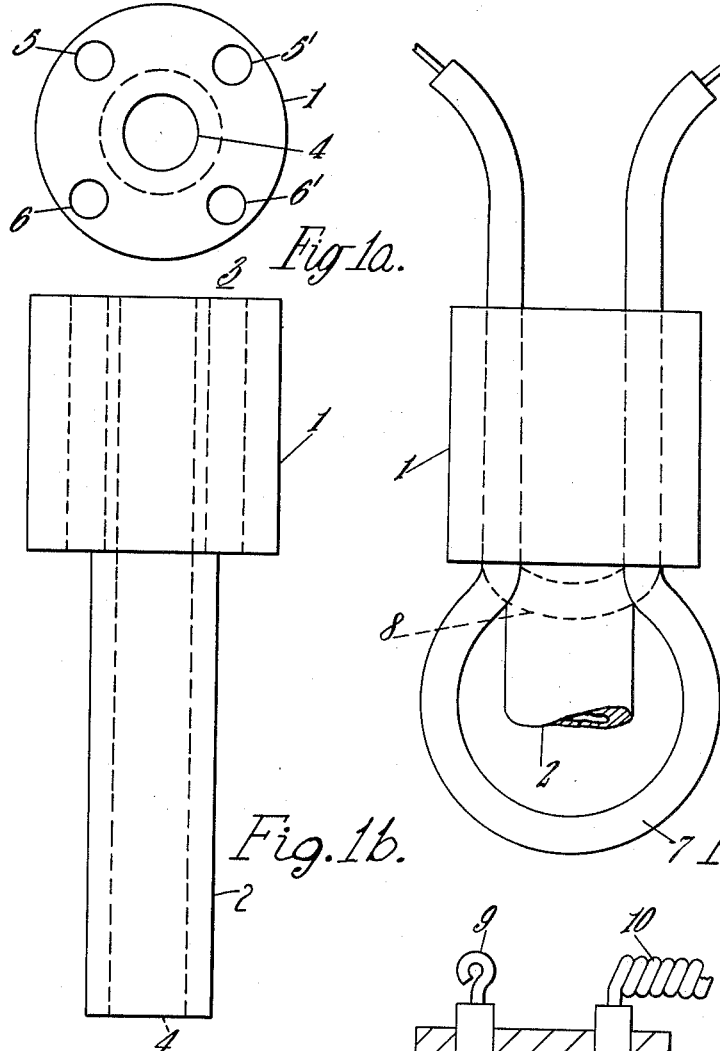
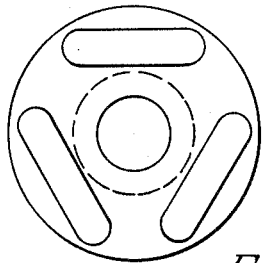
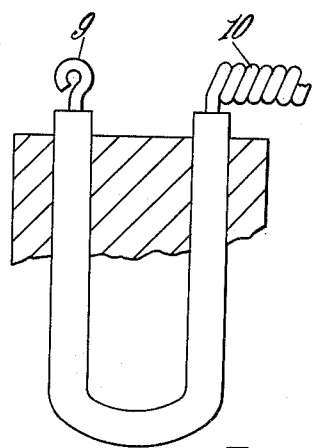

Dec. 24, 1963     S. N. COUZENS     3,115,377
TERMINAL UNIT FOR MOVABLE ELECTRICAL APPARATUS
Filed Dec. 11, 1962     2 Sheets-Sheet 2

United States Patent Office 3,115,377
Patented Dec. 24, 1963

3,115,377
TERMINAL UNIT FOR MOVABLE ELECTRICAL APPARATUS
Sydney Norman Couzens, Kent, England, assignor to Muirhead & Co. Limited, Kent, England
Filed Dec. 11, 1962, Ser. No. 243,934
Claims priority, application Great Britain Nov. 21, 1962
6 Claims. (Cl. 339—2)

This invention relates to means for making electrical connexion between a fixed point and a point which is required to move relative to the fixed point. In rotary electrical machines it is known to terminate the electrical windings or coils of the rotor or armature on sliprings rigidly attached to the rotor shaft and insulated therefrom and to make external connexion to the coils through brushes bearing on the sliprings. Thus, electrical current generated in the rotor coils may be led to an external stationary circuit as in the case of an A.C. generator or alternatively a current generated externally may be fed to the rotor coils as for instance in an electric motor.

A family of rotary electrical machines known under the generic name "synchro" having wound rotors for rotating within wound stator assemblies are commonly fitted with sliprings and brushes for the purpose of energising the rotor windings. Synchros are essentially data transmission devices and in one respect their accuracy is dependent on lack of friction in the rotating parts, so that the rotating part may take up an angular position determined by an input signal with the least possible error.

For the smaller sizes in which the available torque is correspondingly low, the friction between the brushes and the sliprings limits the "following" accuracy of the instrument, but this has to be accepted where continuous rotation is required.

However, in some applications the rotation of the rotor is not required to exceed one or two revolutions in either direction and in such cases flexible connexions or ligaments have been used in place of sliprings and brushes, thereby to eliminate brush friction. It will be appreciated that the use of flexible connexions in place of sliprings and brushes ensures a long and maintenance-free operational life and provides absolute reliability of electrical contact.

The simplest ligament arrangement is to take the electrical conductors from the synchro rotor winding through the shaft (which is made hollow for this purpose) to suitable exterior terminating points. In this system, continuous movement of the rotor with consequent flexing of the conductors eventually causes the conductors to fracture within the shaft. This entails either fitting a new instrument or, at least, a new wound rotor assembly.

A further ligament design uses spiral hairsprings to provide the required flexibility, but they are difficult to set up, fragile, and electrical insulation is a problem in small units. Furthermore, rotation is limited to about 1½ revolutions.

It is an object of the present invention to provide a terminal unit which is simple and cheap to manufacture, resistant to adverse climatic conditions, adaptable to numerous applications and exhibits none of the aforementioned disadvantages.

The invention consists in a terminal means for an electrical conductor in association with a rotatable electrical device comprising a support carrying common terminal means for the electrical conductor and an external flexible flylead and anchoring means for the external flexible flylead whereby the electrical conductor is prevented from flexing or twisting when the electrical device is rotated and external strains in the flylead are not transmitted to the common terminal point.

Conveniently the common terminal means and anchoring means may be formed from a single length of wire.

The length of wire may be secured by threading through a passage or passages in the support.

The invention will be further described with reference to the accompanying drawing in which, FIGURE 1a shows the construction of a metal support in plan and FIGURE 1b in elevation.

FIGURE 2 shows a method of attaching a common terminal means and the anchoring means to the metal support.

FIGURE 3 illustrates the formation of the common terminating means and anchoring means.

FIGURE 6 is an end elevation of an arrangement according to the invention adapted to the termination of three conductors.

Figure 4:
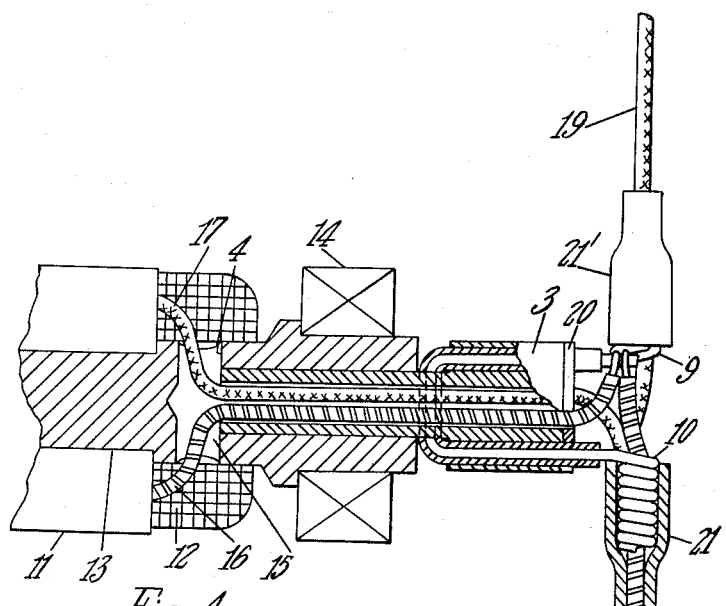
FIGURES 4 and 5 show a complete assembly.

Referring now to FIGURE 1, the body part 1 and spigot part 2 of metal support 3 are machined from stainless steel having desirable anti-corrosion properties. A hole 4 of sufficient diameter to accommodate the conductors issuing from the movable electrical device is bored through the centre of metal support 3. Pairs of holes 5, 5' and 6, 6' are provided in body part 1 to accommodate the common terminating and anchoring means as will be explained later. Spigot part 2 is machined to be a push fit in a hole in the end of the shaft carrying the rotating electrical device.

The common terminal and anchorage illustrated in FIGURES 2 and 3 is easily fabricated from readily obtainable materials. The fabrication and assembly of the combined common terminal and anchorage and assembly onto the body part 1 of metal support 3 is carried out in one simple procedure as follows:

A short length of insulating sleeving of such diameter that it will easily pass through holes 5 and 5' is threaded with a length of electrical conductor, for example, tinned copper wire. Preferably, the insulating sleeving is of polytetrafluorethylene (P.T.F.E.) which has well known good electrical properties and is fungus resistant. The two ends of this assembly are passed upwards through holes 5 and 5' respectively as shown in FIGURE 3 and the resultant loop 7 is drawn up into a convenient U-shape as indicated at broken lines 8. The insulating sleeving is then cut back so that only a short length protrudes from holes 5 and 5'. One of the wire ends thus exposed is shortened and made into a small loop 9 (FIG. 3) to form the common terminal and the other exposed wire end is coiled to form an anchorage 10 for the corresponding flylead. A second common terminal and anchorage as above described is made to occupy holes 6, 6' in body part 1 of metal support 3. Of course, for quantity production the U-shaped configuration could be speedily formed using a suitable bending tool.

Figure 5:
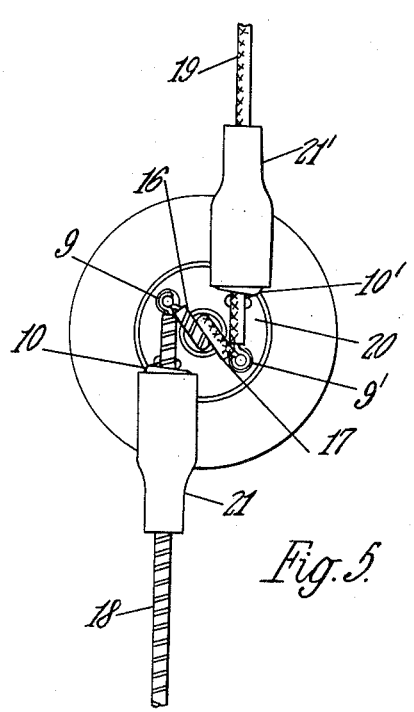

In FIGURES 4 and 5 the rotating electrical device 11, for example, the rotor of a synchro transmitter, carrying electrical winding 12 is mounted for rotation on shaft 13. The end of shaft 13 is carried in bearing 14. The end of shaft 13 is bored axially to take the spigot part 2 of metal support 3 and diametrically as at 15 to enable the conductors 16 and 17 issuing from electrical winding 12 to enter the hollow shaft. It will be clearly seen from the drawing that conductor 16 is brought out through the hollow shaft, the centre hole 4 in metal support 3 and P.T.F.E. washer 20, and terminated on a common terminal 9. The corresponding flylead 18, also terminated on the common terminal 9 by any accepted method is led out through anchorage 10. Similarly, conductor 17 and flylead 19 are terminated on common terminal 9' and the flylead is led out through anchorage 10'.

Anchorages 10 and 10' may be improved by placing short lengths of insulating sleeeving 21, 21' over the coiled parts and extending a little way along the corresponding flyleads. Conveniently, the lengths of sleeving may be of coloured silicone rubber for easy identification of the conductors. Spigot part 2 of metal support 3 is held permanently in position in hollow shaft 13 by the use of a suitable adhesive, preferably of the epoxy resin kind.

In operation, any twist is taken up by the flyleads 18 and 19 which are made long enough not to be over-stressed by the amount of twist involved (say up to two revolutions of the synchro). The common terminals 9, 9' are protected from strain by the anchorages 10, 10'.

The above described embodiment relates to a synchro having a single rotor winding. However, synchros of the differential kind and others have three rotor windings, star or delta connected so that it is required to bring out three conductors. FIGURE 6 shows in a general way how three combined terminal and anchorage assemblies may be accommodated on a metal support to meet this case.

The invention has the following desirable features.

(1) It is suitable for operation in the temperature range —65° C. to +200° C.

(2) Fully corrosion and fungus resistant.

(3) Construction is simple and robust, requiring no adhesive or screws so that nothing can work loose by vibration or shock forces.

(4) The anchorage for the flylead is at the same potential as the conductor, thus obviating electrical breakdown to the anchoring system.

(5) The design lends itself to miniaturization, with consequent reduction in weight and inertia.

(6) The anchoring principle can be extended and shaped to suit various conditions.

It will be understood that no restriction is made to the particular forms of embodiment and details of construction illustrated in the drawings which are quoted mainly by way of example, and that numerous modifications are quite possible within the meaning of the above description.

I claim:

1. Terminal means for an electrical conductor in association with a rotatable electrical device comprising a support, an axial passage through the support, a pair of circumferentially spaced passages in the support parallel to the axial passage, a U-shaped wire extending through both of the circumferentially spaced passages and forming at one end a terminal means and at the other end an anchoring means, an electrical conductor extending through the axial passage and secured to the terminal means and a flexible flylead secured to the terminal means and extending through the anchoring means.

2. Terminal means as claimed in claim 1 in which the support is of metal and the U-shaped wire is insulated therefrom.

3. Terminal means as claimed in claim 1 comprising a short insulating sleeve covering the end of the U-shaped wire serving an anchoring means and corresponding part of the flylead.

4. Terminal means as claimed in claim 1, in which said other end of the U-shaped wire is coiled to form the anchoring means.

5. Terminal means for electric conductors in association with a rotatable electrical device comprising a support having an axial passage therethrough, a plurality of electrical conductors extending through the axial passage, a plurality of pairs of circumferentially spaced passages in the support parallel to the axial passage, a plurality of U-shaped wires respectively secured in the pairs of passages one end of each forming a terminal means and the other end forming an anchoring means, a plurality of electrical conductors extending through the axial passage and secured to the respective terminal means and a plurality of flexible flyleads secured to the respective terminal means and extending through the corresponding anchoring means.

6. Terminal means as claimed in claim 5 in which the support is extended by means of a spigot having an axial passage for the electrical conductor.

References Cited in the file of this patent
UNITED STATES PATENTS
2,702,889    Bareford _____ Feb. 22, 1955